(12) United States Patent
Shirahama et al.

(10) Patent No.: US 9,952,334 B2
(45) Date of Patent: Apr. 24, 2018

(54) PULSE DETECTION CIRCUIT, RADIATION DETECTION CIRCUIT, AND RADIATION DETECTION APPARATUS

(71) Applicant: Kabushiki Kaisha Toshiba, Minato-ku (JP)

(72) Inventors: Hirokatsu Shirahama, Yokohama (JP); Tetsuro Itakura, Nerima (JP); Masanori Furuta, Odawara (JP); Shunsuke Kimura, Kawasaki (JP); Go Kawata, Kawasaki (JP); Hideyuki Funaki, Shinagawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 145 days.

(21) Appl. No.: 15/165,182

(22) Filed: May 26, 2016

(65) Prior Publication Data

US 2016/0349380 A1 Dec. 1, 2016

(30) Foreign Application Priority Data

Jun. 1, 2015 (JP) .................................. 2015-111430

(51) Int. Cl.
*G01J 1/00* (2006.01)
*G01T 1/17* (2006.01)
(Continued)

(52) U.S. Cl.
CPC .................. *G01T 1/17* (2013.01); *G01T 1/18* (2013.01); *G01T 1/2018* (2013.01); *G01T 1/24* (2013.01)

(58) Field of Classification Search
CPC .... G01T 1/17; G01T 7/00; G01T 1/02; G01T 1/161; G01T 1/29
See application file for complete search history.

(56) References Cited

U.S. PATENT DOCUMENTS 7,763,859 B2 7/2010 Mott
7,807,973 B2 10/2010 Mott
(Continued)

FOREIGN PATENT DOCUMENTS

JP 63-44406 U 3/1988
JP 1-146183 U 10/1989
(Continued)

*Primary Examiner* — David Porta
*Assistant Examiner* — Mamadou Faye
(74) *Attorney, Agent, or Firm* — Oblon, McClelland, Maier & Neustadt, L.L.P.

(57) ABSTRACT

A pulse detection circuit according to an embodiment includes a conversion circuit, a delay circuit, first and second comparators, a latch, and a generation circuit. The conversion circuit converts an input signal into a thermometer code signal. The delay circuit outputs a delay signal being the thermometer code signal delayed by a predetermined delay time. The first comparator (The second comparator) compares the thermometer code signal with the delay signal and outputs an increase signal (a decrease signal) indicating whether the input signal is larger (smaller) than the input signal before the delay time. Based on the increase signal and the decrease signal, the latch outputs an increase-decrease signal indicating whether the input signal is increasing or decreasing. Based on the thermometer code signal and the increase-decrease signal, the generation circuit generates a pulse detection signal and a pileup detection signal.

12 Claims, 9 Drawing Sheets

(51) Int. Cl.
  *G01T 1/20*  (2006.01)
  *G01T 1/24*  (2006.01)
  *G01T 1/18*  (2006.01)

(56) References Cited

U.S. PATENT DOCUMENTS

| | | | |
|---|---|---|---|
| 2004/0027183 A1* | 2/2004 | Binkley | H03K 5/007 327/172 |
| 2011/0128176 A1* | 6/2011 | van Veldhoven | H03M 1/502 341/155 |

FOREIGN PATENT DOCUMENTS

| | | |
|---|---|---|
| JP | 5-43428 | 11/1993 |
| JP | 2010-538245 | 12/2010 |
| JP | 2011-530067 | 12/2011 |

* cited by examiner

US 9,952,334 B2

PULSE DETECTION CIRCUIT, RADIATION DETECTION CIRCUIT, AND RADIATION DETECTION APPARATUS

CROSS REFERENCE TO RELATED APPLICATION(S)

This application is based upon and claims the benefit of priority from the prior Japanese Patent Application No. 2015-111430, filed on Jun. 1, 2015, the entire contents of which are incorporated herein by reference.

FIELD

Embodiments described herein relate generally to a pulse detection circuit, a radiation detection circuit, and a radiation detection apparatus.

BACKGROUND

There has conventionally been proposed a pulse detection circuit that detects a pulse that is input and a pileup occurring to the pulse that is input. In the conventional pulse detection circuit capable of detecting the pileup, an AD converter operable at a high speed, an analog delay circuit with a long delay time, and the like are employed, whereby the conventional pulse detection circuit had a problem in that power consumption and a circuit area are large.

DETAILED DESCRIPTION

Embodiments will now be explained with reference to the accompanying drawings. The present invention is not limited to the embodiments.

A pulse detection circuit according to an embodiment is provided with a conversion circuit, a delay circuit, first and second comparators, a latch, and a generation circuit. The conversion circuit converts an input signal into a thermometer code signal. The thermometer code signal indicates a level of the input signal with a thermometer code. The delay circuit outputs a delay signal, which is the thermometer code signal delayed for a predetermined delay time.

The first comparator compares the thermometer code signal with the delay signal and outputs an increase signal that indicates whether the input signal is larger than the input signal before the delay time. The second comparator compares the thermometer code signal with the delay signal and outputs a decrease signal that indicates whether the input signal is smaller than the input signal before the delay time. Based on the increase signal and the decrease signal, the latch outputs an increase-decrease signal that indicates whether the input signal is increasing or decreasing. Based on the thermometer code signal and the increase-decrease signal, the generation circuit generates a pulse detection signal and a pileup detection signal.

Figure 1:
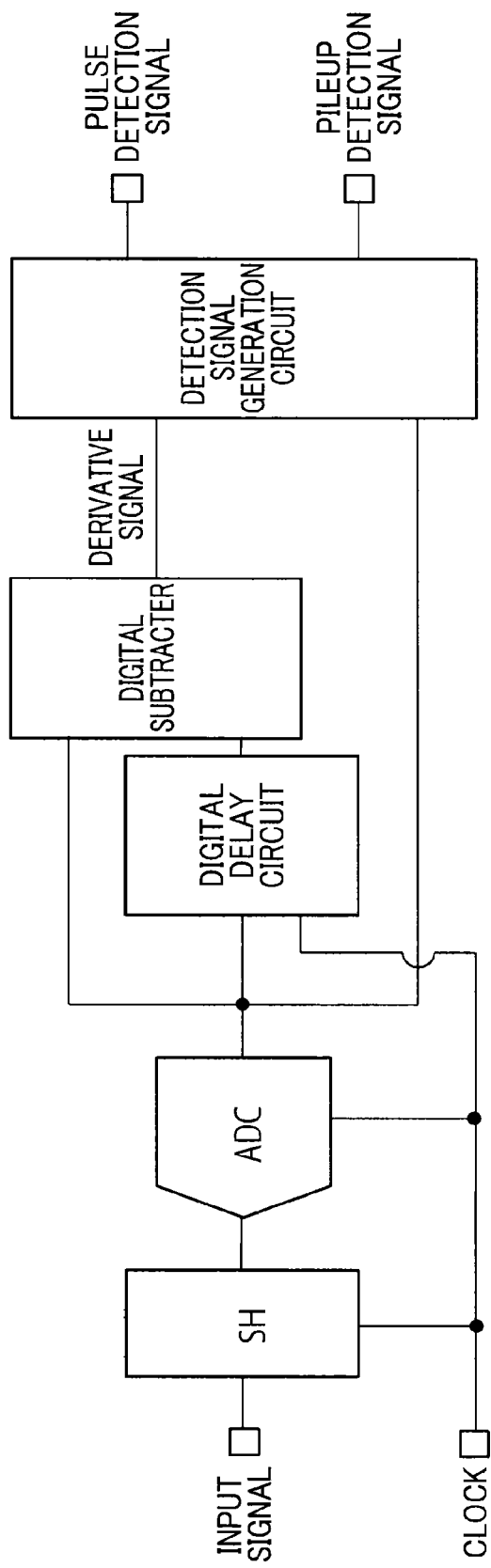
FIG. 1 is a diagram illustrating an exemplary conventional pulse detection circuit.

First, a conventional pulse detection circuit capable of detecting a pileup is described with reference to FIGS. 1 to 4. FIG. 1 is a diagram illustrating an exemplary conventional pulse detection circuit. The pulse detection circuit in FIG. 1 is provided with a sample hold circuit SH, an AD converter ADC, a digital delay circuit, a digital subtracter, and a detection signal generation circuit. Each constituent element of the pulse detection circuit in FIG. 1 operates in discrete time in synchronization with a clock.

The sample hold circuit SH receives an input signal and the clock. The sample hold circuit SH samples the input signal, and holds and outputs the sampled input signal for each clock.

The AD converter ADC receives the output signal and the clock from the sample hold circuit SH. The AD converter ADC performs AD conversion on the output signal from the sample hold circuit SH and outputs a digital signal for each clock.

The digital delay circuit receives the output signal and the clock from the AD converter ADC. The digital delay circuit delays the output signal from the AD converter ADC for one clock and outputs the output signal. The digital delay circuit is constituted of a flip-flop circuit, for example.

The digital subtracter receives the output signal from the AD converter ADC and the output signal from the digital delay circuit. The digital subtracter subtracts the output signal from the digital delay circuit from the output signal from the AD converter ADC. That is, the digital subtracter subtracts, from a digital signal corresponding to an input signal that has been most recently sampled, a digital signal corresponding to an input signal that has been sampled one clock before the most recently sampled input signal. Then, the digital subtracter outputs a digital signal indicating a subtraction result. The output signal from the digital subtracter becomes a derivative signal of the discrete time corresponding to a difference (inclination) for each clock of the input signal.

The detection signal generation circuit receives the output signal from the AD converter ADC and the output signal from the digital subtracter (derivative signal). Based on two signals that are input, the detection signal generation circuit outputs a pulse detection signal and a pileup detection signal. The pulse detection signal is a signal indicating that a pulse has been detected. The pileup detection signal is a signal indicating that a pileup has been detected. The pileup means overlapping of a plurality of pulses.

Figure 2:
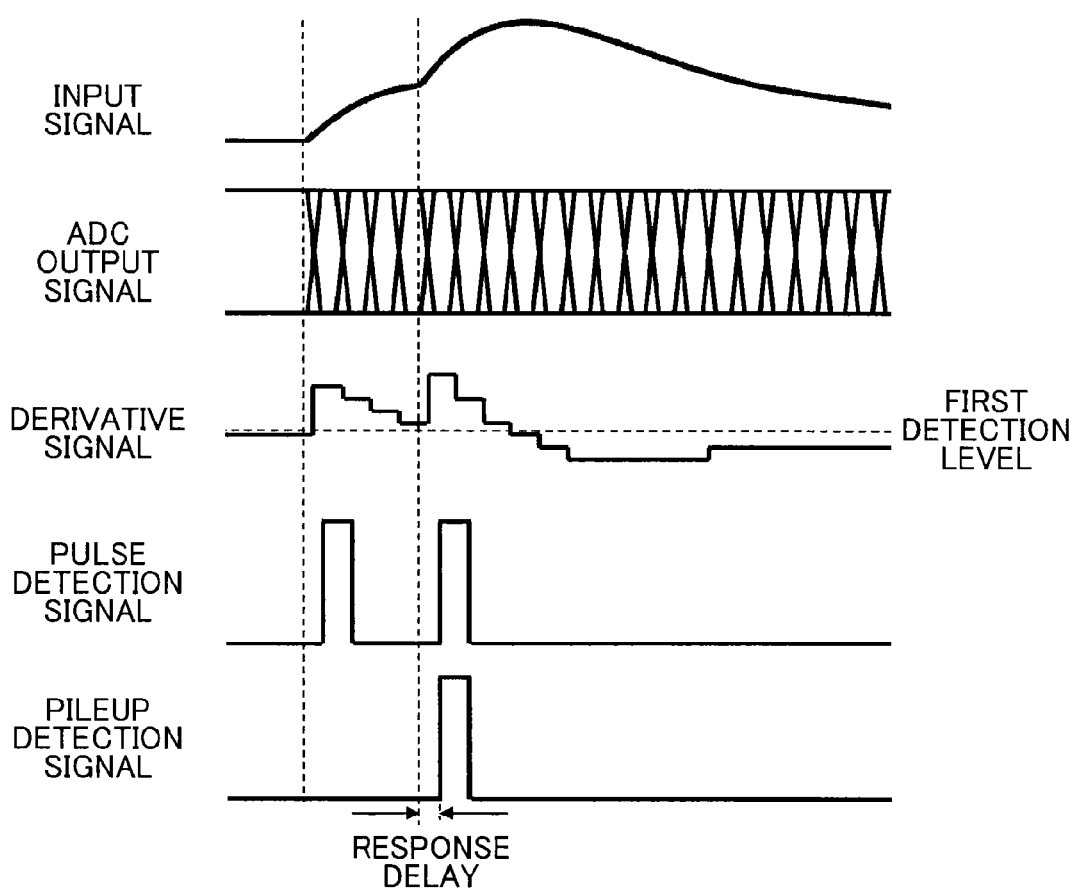
FIG. 2 is a timing chart illustrating operation of the pulse detection circuit in FIG. 1.

Here, FIG. 2 is a timing chart illustrating operation of the pulse detection circuit in FIG. 1. As illustrated in FIG. 2, the detection signal generation circuit outputs the pulse detection signal when the derivative signal becomes a first detection level or above. This is equivalent to detecting a rise of the pulse that is input. That is, the pulse detection circuit in FIG. 1 detects the pulse by detecting the rise of the pulse.

The detection signal generation circuit also outputs the pileup detection signal when the derivative signal shifts from a fall to a rise during a period in which the derivative signal is the first detection level or above. This is equivalent to detecting a rise of the next pulse that is input during a period of a rise of the pulse that is previously input. That is, the pulse detection circuit in FIG. 1 detects the pileup by detecting the rise of the next pulse that is input during the period of the rise of the pulse that is previously input.

As described above, the pulse detection circuit in FIG. 1 is capable of detecting each of the pulse and the pileup. The pulse detection circuit in FIG. 1, however, has a problem in that power consumption is large. This is because the pulse detection circuit in FIG. 1 is provided with the sample hold circuit SH and the AD converter ADC, and further the pulse detection circuit requires a high-speed clock (clock having a frequency of double or more of a highest frequency component of the input signal).

The pulse detection circuit in FIG. 1 also has a problem in that the pulse detection circuit is not capable of detecting a pileup that occurs during a period of a fall of the pulse that is previously input, whereby a range of application may be limited. This is because, as illustrated in FIG. 2, the derivative signal becomes a negative value during the fall of the pulse and becomes smaller than the first detection level.

Figure 3:
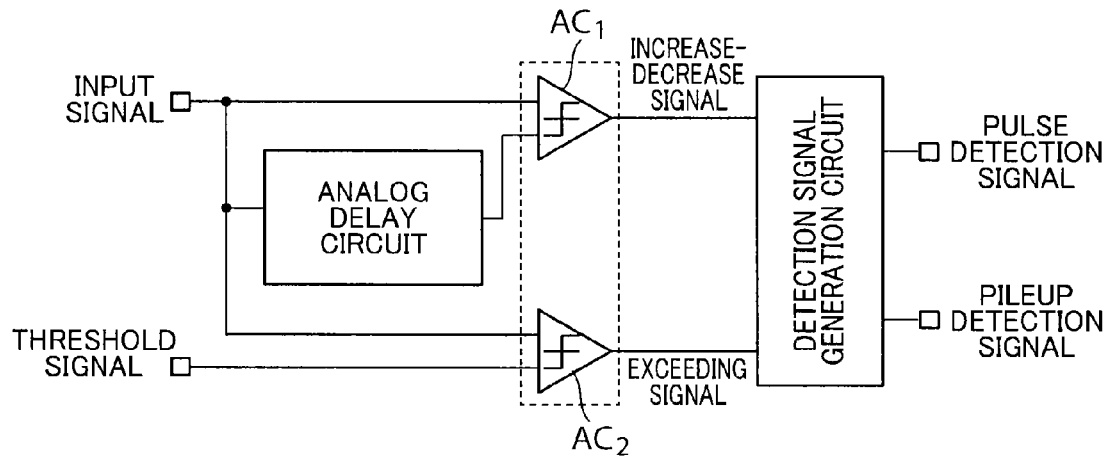
FIG. 3 is a diagram illustrating another exemplary conventional pulse detection circuit.

FIG. 3 is a diagram illustrating another exemplary conventional pulse detection circuit. The pulse detection circuit in FIG. 3 is provided with an analog delay circuit, two analog comparators $AC_1$ and $AC_2$, and a detection signal generation circuit. Each constituent element of the pulse detection circuit in FIG. 3 operates in continuous time.

The analog delay circuit receives an input signal. The analog delay circuit delays the input signal for a predetermined time and outputs the input signal.

The analog comparator $AC_1$ receives the input signal and the output signal from the analog delay circuit. The analog comparator $AC_1$ compares two analog signals that are input. That is, the analog comparator $AC_1$ compares the current input signal with the input signal before a predetermined time. Then, the analog comparator $AC_1$ outputs a binary signal (increase-decrease signal) indicating a comparison result.

Hereinafter, the analog comparator $AC_1$ outputs 1 (High) in a case where the input signal is larger than the output signal from the analog delay circuit and outputs 0 (Low) in a case where the input signal is smaller than the output signal from the analog delay circuit. That is, the increase-decrease signal is 1 in a case where the input signal is increasing, and the increase-decrease signal is 0 in a case where the input signal is decreasing.

The analog comparator $AC_2$ receives the input signal and a threshold signal. The threshold signal is a signal having a predetermined level (second detection level). The analog comparator $AC_2$ compares the input signal with the threshold signal (second detection level) and outputs a binary signal (excess signal) indicating a comparison result.

Hereinafter, the analog comparator $AC_2$ outputs 1 in a case where the input signal is larger than the second detection level and outputs 0 in a case where the input signal is smaller than the second detection level. That is, the excess signal is 1 in a case where the input signal is larger than the second detection level, and the excess signal is 0 in a case where the input signal is smaller than the second detection level.

The detection signal generation circuit receives the output signal from the analog comparator $AC_1$ (increase-decrease signal) and the output signal from the analog comparator $AC_2$ (excess signal). Based on these two signals that are input, the detection signal generation circuit outputs the pulse detection signal and the pileup detection signal.

Figure 4:
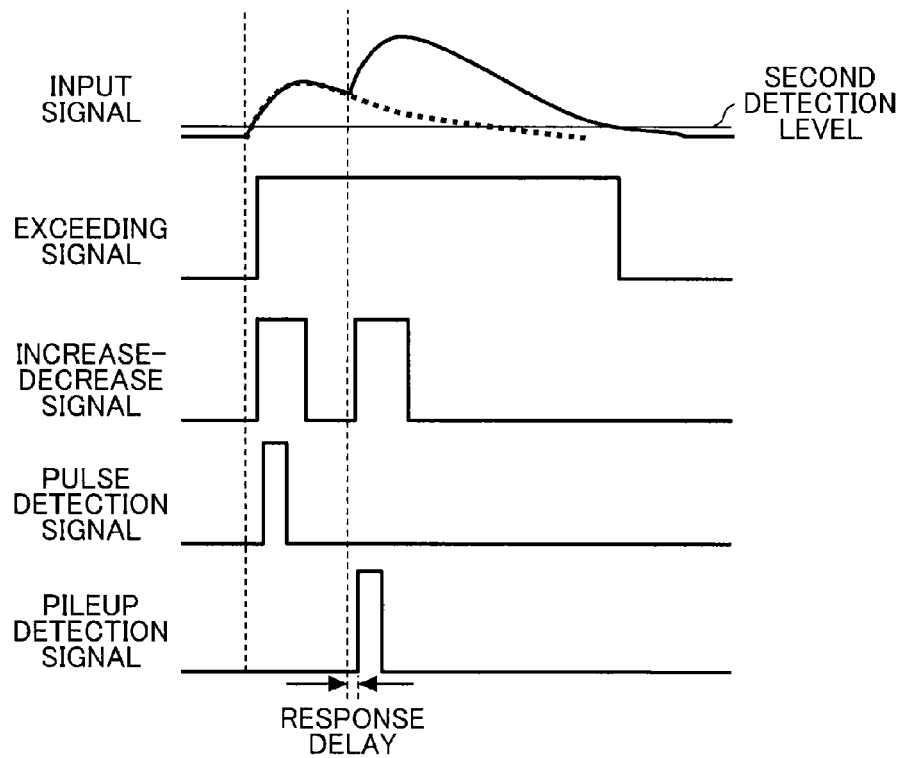
FIG. 4 is a timing chart illustrating operation of the pulse detection circuit in FIG. 3.

Here, FIG. 4 is a timing chart illustrating operation of the pulse detection circuit in FIG. 3. As illustrated in FIG. 4, when the excess signal transits from 0 to 1, the detection signal generation circuit outputs the pulse detection signal. This is equivalent to detecting an input signal larger than the second detection level. That is, the pulse detection circuit in FIG. 3 detects the pulse by detecting the input signal larger than the second detection level.

The detection signal generation circuit also outputs the pileup detection signal when the increase-decrease signal transits from 0 to 1 during a period in which the excess signal is 1. This is equivalent to detecting a shift from a decrease to an increase in the level of the input signal during a period in which the input signal larger than the second detection level is input. That is, the pulse detection circuit in FIG. 3 detects the pileup by detecting the shift from the decrease to the increase in the level of the input signal during the period in which the input signal larger than the second detection level.

As described above, the pulse detection circuit in FIG. 3 is capable of detecting each of the pulse and the pileup. However, the pulse detection circuit in FIG. 3 has a problem in that a response delay of the pulse detection signal and the pileup detection signal becomes longer because it is necessary to make a delay time of the analog delay circuit longer than a delay time of the analog comparators $AC_1$ and $AC_2$.

The pulse detection circuit in FIG. 3 also has a problem in that power consumption and a circuit area become large as an operational amplifier and a delay line are used to constitute the analog delay circuit having a long delay time.

Embodiments of the pulse detection circuit in view of the above background are described below.

First Embodiment

Figure 5:
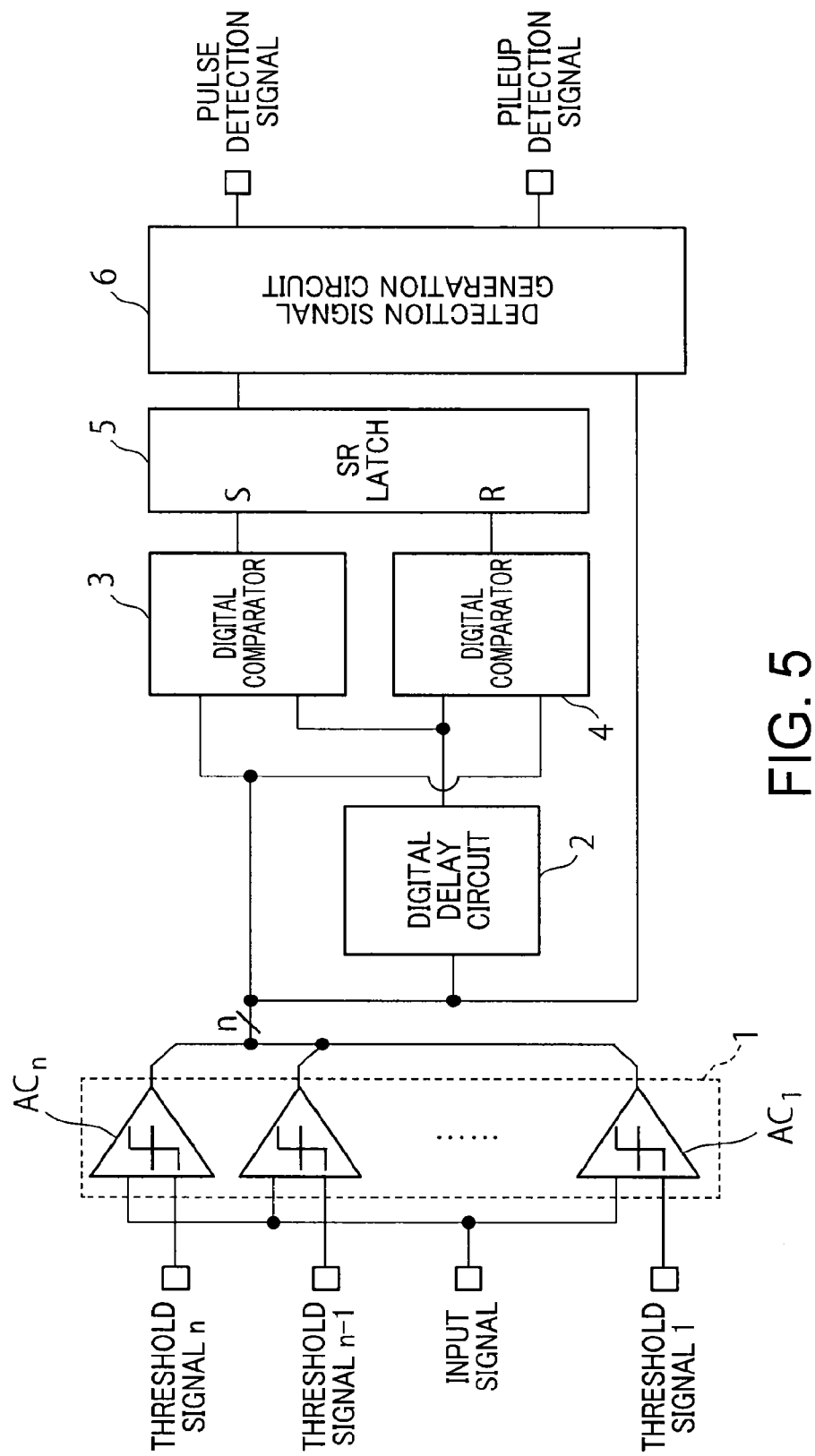
FIG. 5 is a diagram illustrating a pulse detection circuit according to a first embodiment.

A pulse detection circuit according to a first embodiment is described with reference to FIGS. 5 to 8. FIG. 5 is a diagram illustrating the pulse detection circuit according to this embodiment. As illustrated in FIG. 5, the pulse detection circuit according to this embodiment is provided with a thermometer code signal conversion circuit 1, a digital delay circuit 2, digital comparators 3 and 4, a SR latch 5, and a detection signal generation circuit 6, and each constituent element operates in continuous time.

The thermometer code signal conversion circuit 1 (hereinafter, referred to as the "conversion circuit 1") receives an input signal. The conversion circuit 1 converts the input signal into a thermometer code signal and outputs the thermometer code signal. The thermometer code signal is an n-bit digital signal (n≥2) indicating a level of the input signal with a thermometer code.

Hereinafter, an n-bit thermometer code signal output by the conversion circuit 1 is expressed as (XX . . . ). Each bit of the thermometer code signal is denoted by X, which is either 0 or 1. The least significant bit of (XX . . . ) (right-end bit) is referred to as a first bit, and the most significant bit (left-end bit) is referred to as an n-th bit.

In the thermometer code signal, when one bit is 1, all bits lower than (on the right side of) that bit become 1. Accordingly, in a case of a four-bit thermometer code signal, for example, the thermometer code signal may be any of five code signals of (0000), (0001), (0011), (0111), and (1111). In this way, the n-bit thermometer code signal may take (n+1) different values. Thus, the level of the input signal may be expressed with the n-bit thermometer code signal in (n+1) gradations.

As illustrated in FIG. 5, the conversion circuit 1 is provided with n (n≥2) analog comparators $AC_i$ (1≤i≤n). Each of the analog comparators $AC_i$ receives the input signal and a threshold signal i at a predetermined level. The level of the threshold signal i input to each of the analog comparators $AC_i$ is different. Hereinafter, the level of the threshold signal i is referred to as a threshold level i.

The analog comparators $AC_i$ compares the input signal with the threshold signal i and outputs a binary signal indicating a comparison result. Hereinafter, the analog comparators $AC_i$ outputs 1 in a case where the input signal is larger than the threshold signal i (that is, the level of the input signal is larger than the threshold level i) and outputs 0 in a case where the input signal is smaller than the threshold signal i (that is, the level of the input signal is smaller than the threshold level i).

The above-described thermometer code signal is constituted of the output signal from the n analog comparators $AC_i$. In a case where each of the threshold levels i is set such that the threshold levels i increase from a threshold level 1 to a threshold level n in order, the output signal from the analog comparators $AC_i$ corresponds to an i-th bit of the thermometer code signal. An interval of setting each of the threshold levels i (that is, a difference between the threshold level i and a threshold level i+1) may be constant or may be different. A method of setting the threshold level is described below.

The conversion circuit 1 is provided with analog comparators $AC_1$ to $AC_4$ when n=4, for example. The analog comparators $AC_1$ to
$AC_4$ compare the threshold signals 1 to 4, respectively, with the input signal. At this time, each of the threshold levels is set such that the threshold level 1<threshold level 2<threshold level 3<threshold level 4.

In a case where an input signal larger than the threshold level 3 and smaller than the threshold level 4 is input to the conversion circuit 1, the analog comparators $AC_1$ to $AC_3$ output 1 and the analog comparator $AC_4$ outputs 0. Since the output signal from the analog comparator $AC_i$ corresponds to the i-th bit of the thermometer code signal, the thermometer code signal output by the conversion circuit 1 is (0111).

The digital delay circuit 2 receives the thermometer code signal from the conversion circuit 1. The digital delay circuit 2 delays the thermometer code signal that has been input for a predetermined delay time $\tau_2$. The delay time $\tau_2$ is set so as to be longer than delay times $\tau_3$ and $\tau_4$ of the digital comparators 3 and 4.

Hereinafter, the thermometer code signal delayed by the digital delay circuit 2 is referred to as a delay signal. The delay signal is an n-bit digital signal indicating the level of the input signal that has been input before the delay time $\tau_2$ with the thermometer code.

The digital comparator 3 (first digital comparator) receives the thermometer code signal from the conversion circuit 1 and the delay signal from the digital delay circuit 2. The digital comparator 3 compares the thermometer code signal and the delay signal, which have been input, and outputs a binary signal (increase signal) according to a comparison result.

The increase signal is a signal indicating whether or not the current input signal is larger than an input signal before the delay time $\tau_2$. Hereinafter, the digital comparator 3 outputs 1 in a case where the current input signal is larger than the input signal before the delay time $\tau_2$ and outputs 0 in any other cases.

The digital comparator 4 (second digital comparator) receives the thermometer code signal from the conversion circuit 1 and the delay signal from the digital delay circuit 2. The digital comparator 4 compares the thermometer code signal and the delay signal, which have been input, and outputs a binary signal (decrease signal) according to a comparison result.

The decrease signal is a signal indicating whether or not the current input signal is smaller than the input signal before the delay time $\tau_2$. Hereinafter, the digital comparator 4 outputs 1 in a case where the current input signal is smaller than the input signal before the delay time $\tau_2$ and outputs 0 in any other cases.

The digital comparators 3 and 4 have the predetermined delay times $\tau_3$ and $\tau_4$, respectively. As described above, the delay time $\tau_2$ of the digital delay circuit 2 is set to be longer than the delay times $\tau_3$ and $\tau_4$, whereby an operating speed of the pulse detection circuit is limited by the delay times $\tau_3$ and $\tau_4$. In general, a delay time of a digital comparator is shorter than a delay time of an analog comparator, whereby it is possible to make the operating speed of the pulse detection circuit according to this embodiment faster than that of the pulse detection circuit in FIG. 3.

Figure 6:
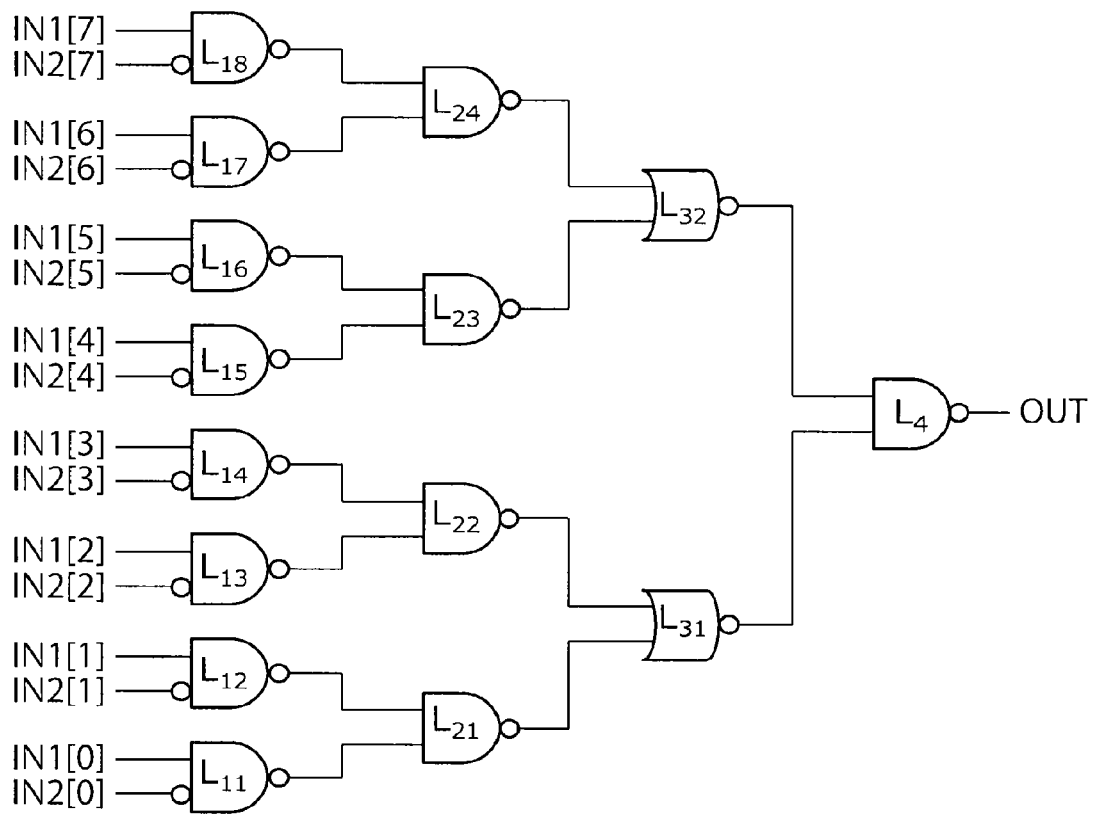
FIG. 6 is a diagram illustrating an exemplary digital comparator in FIG. 5.

Here, FIG. 6 is a diagram illustrating the exemplary digital comparator 3 constituted of a tree-like logic circuit. In FIG. 6, there is illustrated the digital comparator 3 having an eight-bit thermometer code signal (conversion circuit 1 is provided with eight analog comparators $AC_1$ to $AC_8$).

As illustrated in FIG. 6, the digital comparator 3 is provided with NAND gates $L_{11}$ to $L_{18}$, NAND gates $L_{21}$ to $L_{24}$, NOR gates $L_{31}$ and $L_{32}$, and a NAND gate $L_4$. A NAND gate $L_{1i}$ (1≤i≤8) is provided with an input terminal IN1 [i−1] and an input terminal IN2 [i−1]. To the input terminal IN1 [i−1], the output signal from the analog comparators $AC_i$ (i-th bit of the thermometer code signal) is input. To the input terminal IN2 [i−1], the output signal from the analog comparators AC; that has been delayed by the digital delay circuit 2 (i-th bit delay signal) is inversely input. The NAND gate $L_i$, outputs 0 in a case where 1 is input to the input terminal IN1 [i−1] and 0 is input to the input terminal IN2 [i−1], and outputs 1 in any other cases.

The NAND gate $L_{2j}$ (1≤j≤4) is provided with an input terminal IN1 and an input terminal IN2. To the input terminal IN1 of the NAND gate $L_{2j}$, an output signal from the NAND gate $L_{1\,(j\times2)}$ is input.

To the input terminal IN2 of the NAND gate $L_{2j}$, an output signal of the NAND gate $L_{1\,(j\times2-1)}$ is input. The NAND gate $L_{2j}$ outputs 0 in a case where 1 is input to the input terminal IN1 and 1 is input to the input terminal IN2, and outputs 1 in any other cases.

The NOR gate $L_{3k}$ (1≤k≤2) is provided with an input terminal IN1 and an input terminal IN2. To the input terminal IN1 of the NOR gate $L_{3k}$, an output signal from the NAND gate $L_{2\,(k\times2)}$ is input. To the input terminal IN2 of the NOR gate $L_{3k}$, an output signal from the NAND gate $L_{2\,(k\times2-1)}$ is input. The NOR gate $L_{3k}$ outputs 1 in a case where 0 is input to the input terminal IN1 and 0 is input to the input terminal IN2, and outputs 0 in any other cases.

The NAND gate $L_4$ is provided with an input terminal IN1 and an input terminal IN2. To the input terminal IN1 of the NAND gate $L_4$, an output signal from the NOR gate $L_{32}$ is input. To the input terminal IN2 of the NAND gate $L_4$, an output signal from the NOR gate $L_{31}$ is input. The NAND gate $L_4$ outputs 0 in a case where 1 is input to the input terminal IN1 and 1 is input to input terminal IN2, and outputs 1 in any other cases.

Here, operation of the digital comparator 3 is specifically described.

First, there is described a case in which the current input signal is larger than the input signal before the delay time $\tau_2$. Hereinafter, a level of the current input signal is larger than a threshold level 6 and smaller than a threshold level 7. A level of the input signal before the delay time $\tau_2$ is larger than a threshold level 5 and smaller than the threshold level 6. At this time, the thermometer code signal is (00111111), and the delay signal is (00011111).

When the thermometer code signal and the delay signal are input to the digital comparator 3 in FIG. 6, the output signal from the NAND gates $L_{11}$ to $L_{18}$ is (110111111), the output signal from the NAND gates $L_{21}$ to $L_{24}$ is (0100), the output signal from the NOR gates $L_{31}$ and $L_{32}$ is (01), and the output signal from the NAND gate $L_4$ is 1.

In this way, the digital comparator 3 in FIG. 6 outputs 1 in a case where the current input signal is larger than the input signal before the delay time $\tau_2$. That is, the increase signal is 1.

Next, a case in which the current input signal is smaller than input signal before the delay time $\tau_2$ is described. Hereinafter, the level of the current input signal is larger than the threshold level 5 and is smaller than the threshold level 6. The level of the input signal before the delay time $\tau_2$ is larger than the threshold level 6 and is smaller than the threshold level 7. At this time, the thermometer code signal is (00011111), and the delay signal is (00111111).

When the thermometer code signal and the delay signal are input to the digital comparator 3 in FIG. 6, the output signal from the NAND gates $L_{11}$ to $L_{18}$ is (11111111), the output signal from the NAND gates $L_{21}$ to $L_{24}$ is (0000), the output signal from the NOR gates $L_{31}$ and $L_{32}$ is (11), and the output signal from the NAND gate $L_4$ is 0.

In this way, the digital comparator 3 in FIG. 6 outputs 0 in a case where the current input signal is smaller than the input signal before the delay time $\tau_2$. That is, the increase signal is 0.

Furthermore, a case in which the level of the current input signal and the level of the input signal before the delay time $\tau_2$ are the same is described. Hereinafter, both of the level of the current input signal and the level of the input signal before the delay time $\tau_2$ are larger than the threshold level 6 and smaller than the threshold level 7. At this time, both of the thermometer code signal and the delay signal is (00111111).

When the thermometer code signal and the delay signal are input to the digital comparator 3 in FIG. 6, the output signal from the NAND gates $L_{11}$ to $L_{18}$ is (11111111), the output signal from the NAND gates $L_{21}$ to $L_{24}$ is (0000), the output signal from the NOR gates $L_{31}$ and $L_{32}$ is (11), and the output signal from the NAND gate $L_4$ is 0.

In this way, the digital comparator 3 in FIG. 6 outputs 0 in a case where the level of the current input signal and the level of the input signal before the delay time $\tau_2$ are the same. That is, the increase signal is 0.

As described, the digital comparator 3 in FIG. 6 outputs 1 in a case where the current input signal is larger than the input signal before the delay time $\tau_2$, and outputs 0 in any other cases. That is, the logic circuit in FIG. 6 may be used as the digital comparator 3 according to this embodiment. This is because the input signal is converted into the thermometer code signal in this embodiment.

An order of the delay time $\tau_3$ of the digital comparator 3 is log (n). In contrast, as illustrated in FIG. 1, an order of a delay time of a general digital comparator, to which an AD-converted digital signal is input, is n. Thus, by constituting the digital comparator 3 of the tree-like logic circuit illustrated in FIG. 6, it is possible to make the delay time shorter than that of the digital comparator used in the conventional pulse detection circuit. As a result, it is possible to make the operating speed of the pulse detection circuit faster.

Note that in the example in FIG. 6, the digital comparator 3 is constituted of the NAND gate and the NOR gate; however, the digital comparator 3 may also be constituted only of the NAND gate or the NOR gate, or may also be constituted of an AND gate and a NOT gate.

Furthermore, in the example in FIG. 6, the thermometer code signal has eight bits; however, the number of the bits of the thermometer code signal is arbitrary. In any cases, the digital comparator 3 may be constituted of the tree-like logic circuit.

Still furthermore, it is also possible to constitute the digital comparator 4 of the logic circuit in FIG. 6. In a case where the logic circuit in FIG. 6 is used as the digital comparator 4, the thermometer code signal and the delay signal may be input to a terminal opposite to the one used when used as the digital comparator 3. That is, the delay signal is input to the input terminal IN1 [i–1] of the NAND gate $L_{1i}$, and the thermometer code signal is input to the input terminal IN2 [i–1] of the NAND gate $L_{1i}$. By constituting the digital comparator 4 of the tree-like logic circuit in FIG. 6, it is possible to make the delay time $\tau_4$ shorter and make the operating speed of the pulse detection circuit faster.

The SR latch 5 is provided with an S input terminal and an R input terminal. The S input terminal receives the increase signal from the digital comparator 3. The R input terminal receives the decrease signal from the digital comparator 4. Based on the increase signal and the decrease signal, the SR latch 5 outputs an increase-decrease signal. The increase-decrease signal is a binary signal indicating whether the input signal is increasing or decreasing. Hereinafter, the SR latch 5 outputs 1 when the input signal is increasing and outputs 0 when the input signal is decreasing.

Specifically, the SR latch 5 outputs 1 in a case where the increase signal is 1 and the decrease signal is 0. The SR latch 5 outputs 0 in a case where the increase signal is 0 and the decrease signal is 1. Furthermore, in a case where the increase signal is 0 and the decrease signal is 0, the SR latch 5 holds a value being output at the time, which is either 0 or 1.

The detection signal generation circuit 6 (hereinafter, referred to as the "generation circuit 6") receives the thermometer code signal from the conversion circuit 1, and the increase-decrease signal from the SR latch 5. Based on the thermometer code signal and the increase-decrease signal that have been input, the generation circuit 6 generates and outputs a pulse detection signal and a pileup detection signal.

The generation circuit 6 generates the pulse detection signal when the increase-decrease signal transits from 0 to 1. This is equivalent to detecting a rise of a pulse that has been input. That is, the pulse detection circuit according to this embodiment detects the pulse by detecting the rise of the pulse.

The generation circuit 6 also outputs the pileup detection signal when the increase-decrease signal transits from 0 to 1 during a period in which the level of the input signal is larger than a predetermined value. This is equivalent to detecting a rise of the next pulse that is input during a period in which the level of the pulse that has been input before is larger than a predetermined value. That is, the pulse detection circuit according to this embodiment detects a pileup by detecting the rise of the next pulse that is input during the period in which the level of the pulse that has been input before is larger than the predetermined value.

Figure 7:
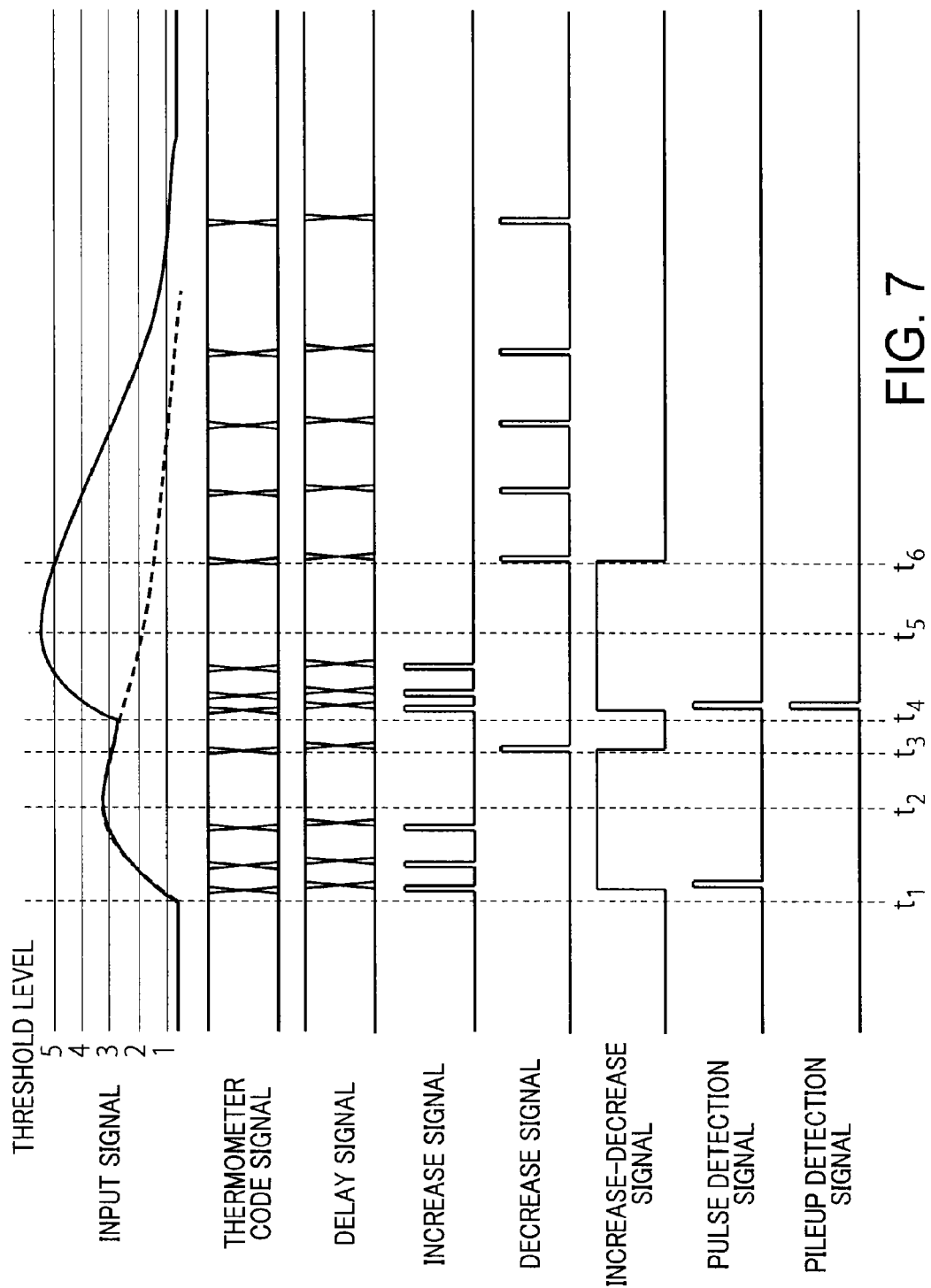
FIG. 7 is a timing chart illustrating operation of the pulse detection circuit in FIG. 5.

Next, operation of the pulse detection circuit according to this embodiment is described specifically with reference to FIG. 7. FIG. 7 is a timing chart illustrating the operation of the pulse detection circuit according to this embodiment. Hereinafter, the conversion circuit 1 is provided with the analog comparators $AC_1$ to $AC_5$, and outputs a five-bit thermometer code signal. The generation circuit 6 detects the pileup in a case where the next pulse is input during the period in which the level of the input signal is larger than the threshold level 2.

As illustrated in FIG. 7, until the pulse is input at time $t_1$, the level of the input signal is smaller than the threshold level 1. Accordingly, at the time $t_1$, the thermometer code signal is (00000), the delay signal is (00000), the increase signal is 0, and the decrease signal is 0. At this time, as illustrated in FIG. 7, the increase-decrease signal is 0.

When a first pulse is input at the time $t_1$, the level of the input signal rises, and the level of the input signal becomes larger than the threshold level 1. The thermometer code signal becomes (00001), the increase signal becomes 1, the increase-decrease signal transits from 0 to 1, and the pulse detection signal is output. That is, the pulse is detected. Note that at a point where the increase-decrease signal transits from 0 to 1, the level of the input signal is smaller than the threshold level 2, whereby the pileup detection signal is not output.

Then, the level of the input signal monotonously rises until time $t_2$ when the first pulse peaks. In an example in FIG. 7, the level of the input signal at the time $t_2$ is larger than the threshold level 3. Thus, at the time $t_2$, the thermometer code signal is (00111), the delay signal is (00111), the increase signal is 0, and the decrease signal is 0.

Since the decrease signal remains 0 until the time $t_2$, the increase-decrease signal stays 1. In this way, in this embodiment, the increase-decrease signal is generated by holding values of the increase signal and the decrease signal by the SR latch 5.

Subsequently, when the level of the input signal becomes smaller than the threshold level 3 at time $t_3$, the thermometer code signal becomes (00011), the decrease signal becomes 1, and the increase-decrease signal transits from 1 to 0.

Then, the level of the input signal stays larger than the threshold level 2 and smaller than the threshold level 3 until time $t_4$ when a second pulse is input. Thus, at the time $t_4$, the thermometer code signal is (00011), the delay signal is (00011), the increase signal is 0, the decrease signal is 0, and the increase-decrease signal is 0.

When the second pulse is input at the time $t_4$ and a pileup occurs, the level of the input signal rises and becomes larger than the threshold level 3. The thermometer code signal becomes (00111), the increase signal becomes 1, the increase-decrease signal transits from 0 to 1, and the pulse detection signal is output. That is, the pulse is detected.

Since the level of the input signal is larger than the threshold level 2 at a point when the increase-decrease signal transits from 0 to 1, the pileup detection signal is output. That is, the pileup is detected.

Then, the level of the input signal monotonously rises until time $t_5$ when the second pulse peaks. In the example in FIG. 7, the level of the input signal at the time $t_5$ is larger than the threshold level 5. Thus, at the time $t_5$, the thermometer code signal is (11111), the delay signal is (11111), the increase signal is 0, the decrease signal is 0, and the increase-decrease signal is 1.

Subsequently, at time $t_6$ when the level of the input signal becomes smaller than the threshold level 5, the thermometer code signal becomes (01111), the decrease signal becomes 1, and the increase-decrease signal transits from 1 to 0.

Hereinafter, the level of the input signal monotonously falls, and becomes smaller than the threshold level 1 at an end of a fall of the second pulse that has been input at the time $t_4$. Until the next pulse is input, the thermometer code signal is (00000), the delay signal is (00000), the increase signal is 0, the decrease signal is 0, and the increase-decrease signal is 0. That is, the level of the input signal returns to a state before the time $t_1$ in FIG. 7.

As described above, the pulse detection circuit according to this embodiment is capable of detecting the pulse and the pileup. Since the pulse detection circuit operates in the continuous time, unlike the pulse detection circuit in FIG. 1, none of the sample hold circuit SH, the AD converter ADC, and the high-speed clock is necessary. Thus, in the pulse detection circuit according to this embodiment, it is possible to suppress power consumption and to decrease a circuit area compared to the pulse detection circuit in FIG. 1.

The pulse detection circuit according to this embodiment delays the thermometer code signal by using the digital delay circuit. In general, the digital delay circuit has smaller power consumption and a smaller circuit area than an analog delay circuit. Thus, the pulse detection circuit according to this embodiment is capable of suppressing the power consumption and decreasing the circuit area compared to the pulse detection circuit in FIG. 3 provided with the analog delay circuit.

Furthermore, the pulse detection circuit according to this embodiment determines an increase and a decrease of the input signal by the digital comparators 3 and 4. In general, a digital comparator operates at a higher speed than an analog comparator. Thus, the pulse detection circuit according to this embodiment is capable of operating faster than the pulse detection circuit in FIG. 3 provided with the analog comparator.

Still furthermore, unlike the pulse detection circuit in FIG. 1, the pulse detection circuit according to this embodiment is capable of detecting a pileup that occurs during a period of a fall of the pulse that is previously input.

Note that, as described above, the pulse detection circuit detects the pileup during the period in which the level of the input signal is larger than the threshold level 2; however, the threshold level that determines a period in which the pileup is detected (detection period) may be arbitrarily set.

Note, however, that in a case where the pileup is detected during a period in which the level of the input signal is larger than the threshold level 1, it is necessary to delay a start of the detection period for a predetermined time. That is, the generation circuit 6 needs to determine whether it is the detection period now by comparing the level of the input signal before the predetermined time with the threshold level 1 due to a following reason.

As described above, in timing when the pulse is input and the increase-decrease signal transits from 0 to 1, the level of the input signal is larger than the threshold level 1. Thus, in a case where the start of the detection period is not delayed, the above-described timing is within the detection period. As a result, when the pulse is input, the increase-decrease signal transits from 0 to 1 during the detection period, whereby the generation circuit 6 erroneously detects a pileup.

In contrast, in a case where the detection period is delayed, in the above-described timing, the level of the input signal before the predetermined time is compared with the threshold level 1. Here, when the predetermined time is set to be longer than a response time of the pileup detection signal, the input signal before the predetermined time is an input signal before the level becomes larger than the threshold level 1. As a result, it is determined that the above-described timing is not within the detection period, and the pileup is not erroneously detected.

By delaying the start of the detection period in this way, it is possible to suppress an erroneous detection of the pileup in the timing where the pulse is input. Delaying of the detection period becomes possible by the generation circuit 6 determining the detection period by comparing the thermometer code signal (for example, the delay signal), which is delayed by the digital delay circuit and the like, with the threshold level 1.

As described above, as illustrated in FIG. 7, it is presumed that a pulse having a higher level than a no-signal level is input to the pulse detection circuit; however, a pulse having a lower level may also be input. In this case, the generation circuit 6 may output the pulse detection signal when the increase-decrease signal transits from 1 to 0. The generation circuit 6 may also output the pileup detection signal when the increase-decrease signal transits from 1 to 0 during a period in which the level of the input signal is smaller than a predetermined value.

Here, the method of setting the threshold level in this embodiment is described with reference to FIG. 8. In the pulse detection circuit according to this embodiment, detection accuracy of the pulse and the pileup improves as more threshold levels are set. Setting more threshold levels, however, results in increasing the number of the analog comparators $AC_i$, whereby the power consumption and the circuit area of the conversion circuit 1 are also increased. Accordingly, from a viewpoint of the power consumption and the circuit area, it is preferred that the threshold levels be few. Thus, the method of setting in FIG. 8 is considered as a method of setting the threshold level capable of accurately detecting the pulse and the pileup with the few threshold levels.

Figure 8:
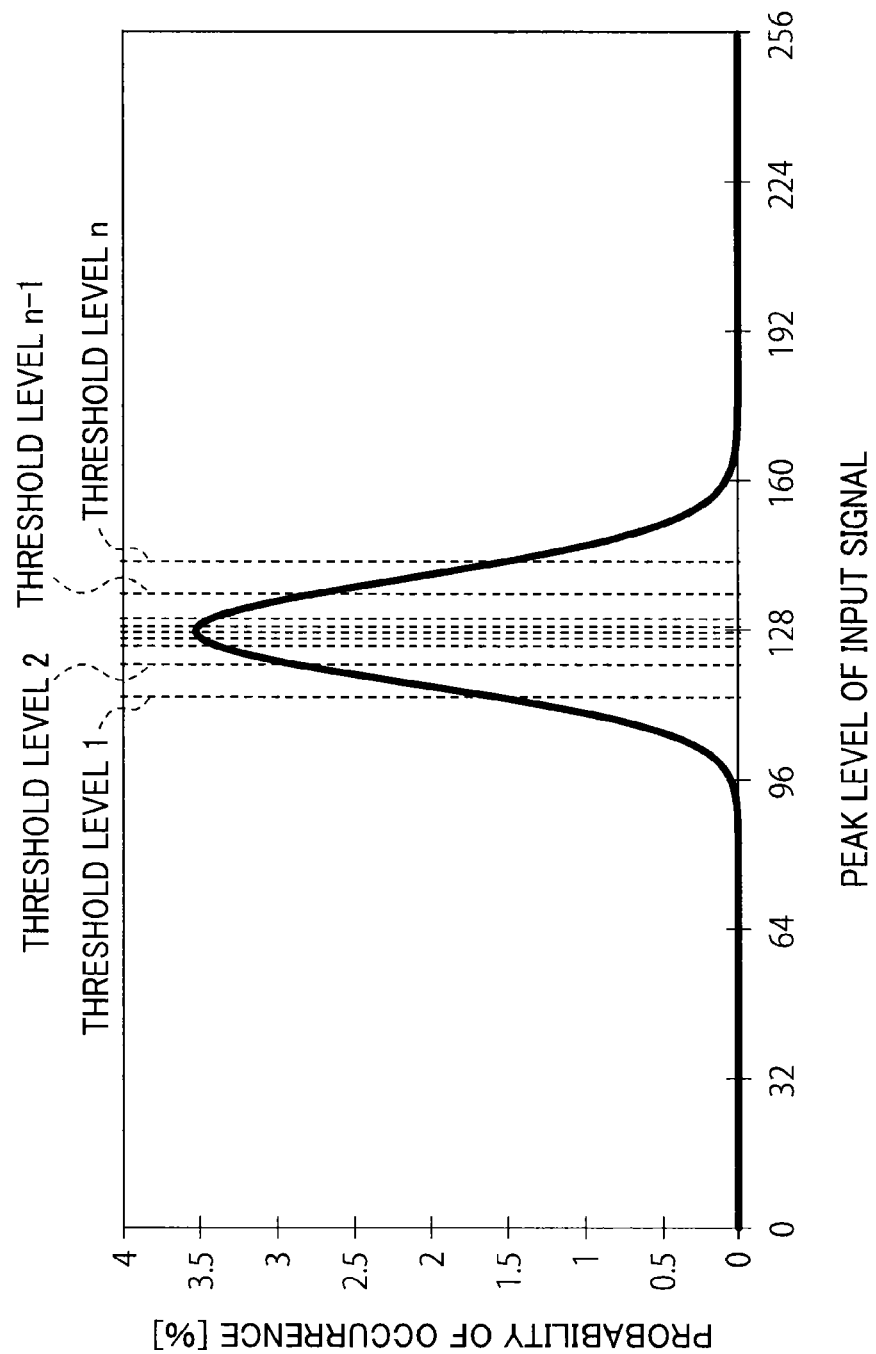
FIG. 8 is a graph illustrating an exemplary method of setting a threshold level.

FIG. 8 is a graph illustrating the exemplary method of setting the threshold level. In FIG. 8, a bold line indicates a probability of occurrence of a peak level of the input signal. In the example in FIG. 8, the probability of occurrence of the peak level of the pulse reaches a maximum at 128 and decreases as the peak level is away from 128.

For such pulse, the n threshold levels are set such that an interval therebetween is narrow in a level region having a high probability of occurrence of the peak level and the interval therebetween is wide in the level region having a low probability of occurrence thereof. That is, the n threshold levels are set such that the interval therebetween is narrow in the level region near 128 and the interval therebetween is wide in the level region away from 128. By setting the n threshold levels in this way, it is possible to improve the detection accuracy of the pulse and the pileup compared to when the n threshold levels are set at regular intervals.

This method of setting the threshold level may be achieved by setting the n threshold levels such that the probability of occurrence of the peak level is divided equally into n+1. For example, when n=4, thresholds 1 to 4 may be set such that the probability of occurrence of the peak level is equal in five level regions divided by four threshold levels. The probability of occurrence of the peak level in each of the level regions corresponds to an area below the bold line in FIG. 8. Note that the probability of occurrence of the peak level as in FIG. 8 may be obtained through an experiment.

Second Embodiment

Figure 9:
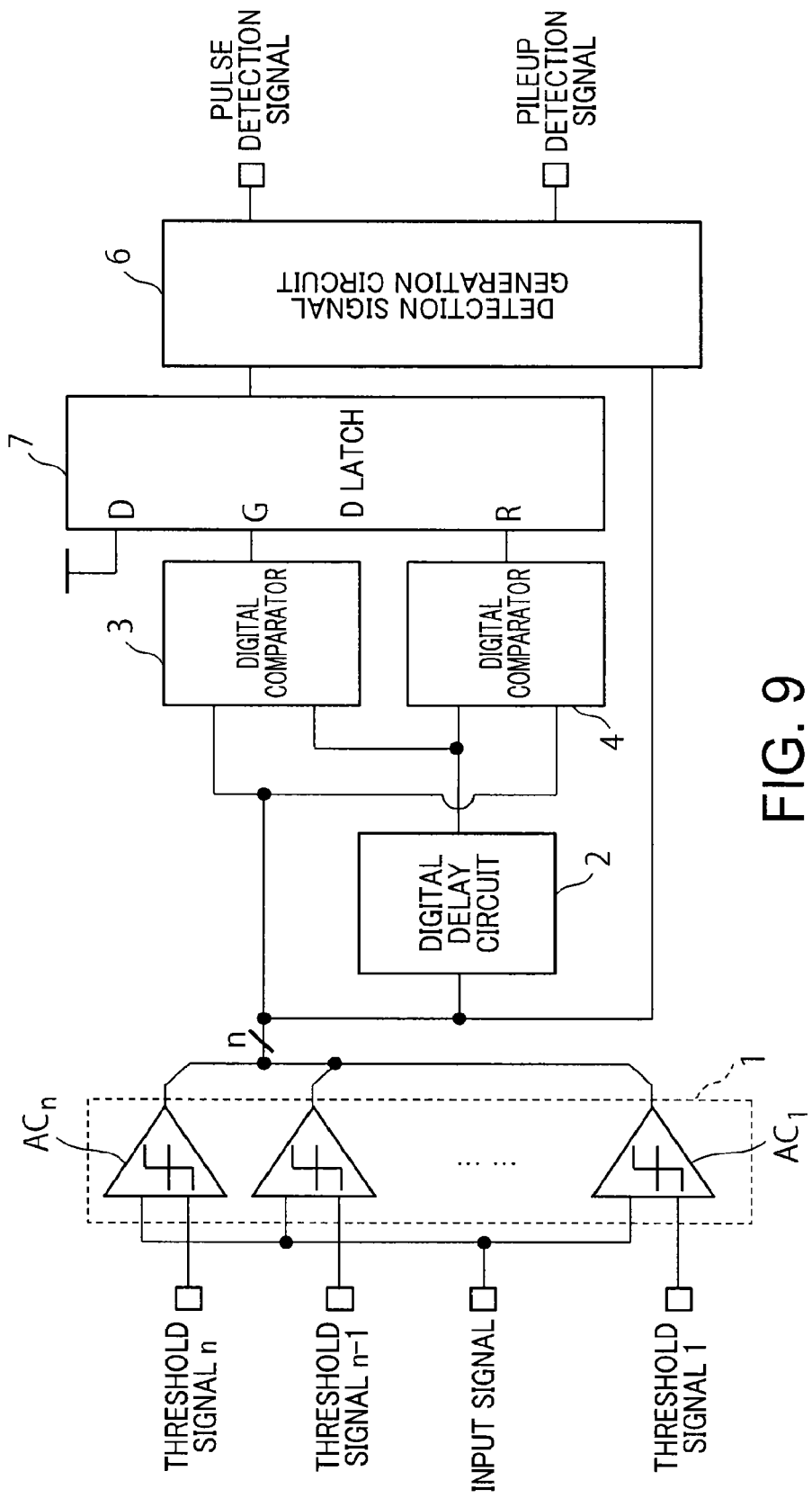
FIG. 9 is a diagram illustrating a pulse detection circuit according to a second embodiment.

A pulse detection circuit according to a second embodiment is described with reference to FIG. 9. FIG. 9 is a diagram illustrating a pulse detection circuit according to this embodiment. As illustrated in FIG. 9, the pulse detection circuit according to this embodiment is provided with a D latch 7 in place of the SR latch 5. Any other constituent element is the same as that of the first embodiment.

The D latch 7 is provided with a D input terminal, a G input terminal, and an R input terminal. The D input terminal is connected to a power supply line. The G input terminal receives an increase signal from the digital comparator 3. The R input terminal receives a decrease signal from the digital comparator 4. Based on the increase signal and the decrease signal, the D latch 7 outputs an increase-decrease signal. Hereinafter, the D latch 7 outputs 1 when an input signal is increasing and outputs 0 when the input signal is decreasing. At this time, the D latch 7 operates in the same way as the SR latch 5 of the first embodiment.

Specifically, the D latch 7 outputs 1 in a case where the increase signal is 1 and the decrease signal is 0. The D latch 7 outputs 0 in a case where the increase signal is 0 and the decrease signal is 1. Furthermore, in a case where the increase signal is 0 and the decrease signal is 0, the D latch 7 holds a value being output at the time, which is either 0 or 1.

Since the SR latch 5 has a loop structure, analysis of operation timing is difficult by a general method of designing a digital circuit. In contrast, the D latch 7 does not have the loop structure. Thus, by using the D latch 7 in place of the SR latch 5 as in this embodiment, it is possible to constitute a pulse detection circuit in which analysis of the operation timing is easy.

Third Embodiment

Figure 10:
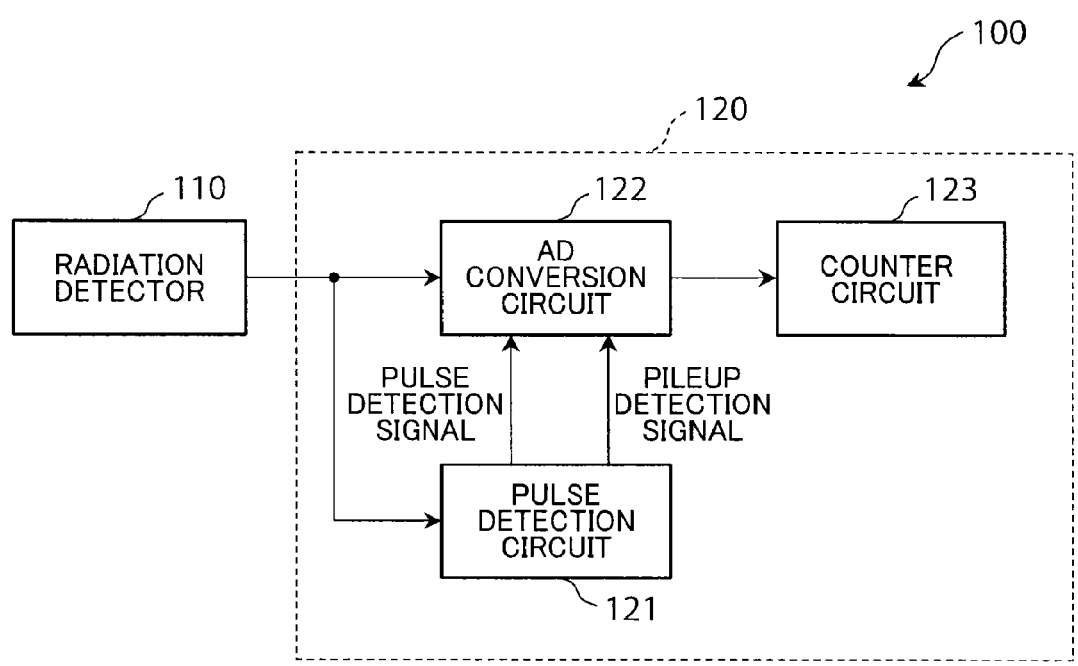
FIG. 10 is a diagram illustrating a radiation detection apparatus according to a third embodiment.

A radiation detection apparatus 100 according to a third embodiment is described with reference to FIG. 10. The radiation detection apparatus 100 according to this embodiment is provided with the pulse detection circuit according to the first embodiment or the second embodiment described above. FIG. 10 is a diagram illustrating the radiation detection apparatus 100 according to this embodiment. As illustrated in FIG. 10, the radiation detection apparatus 100 is provided with a radiation detector 110 and a radiation detection circuit 120.

The radiation detector 110 outputs a signal according to an incident radiation. In general, the signal output from the radiation detector 110 becomes a pulse. The radiation detector 110, for example, is a scintillation detector provided with a scintillator and a photo multiplier; however, the radiation detector 110 is not limited to this. The radiation detector 110 may also be a semiconductor detector or a Geiger-Muller tube (GM tube), for example. The output signal from the radiation detector 110 is input to the radiation detection circuit 120.

The radiation detection circuit 120 is a signal processing circuit that performs signal processing on the output signal from the radiation detector 110. Based on the output signal from the radiation detector 110, the radiation detection circuit 120 performs detection and distinction of a radiation. The radiation detection circuit 120 may be integrally formed with the radiation detector 110 or may be formed as an integrated circuit (IC) connectable to the radiation detector 110. As illustrated in FIG. 10, the radiation detection circuit 120 is provided with a pulse detection circuit 121, an AD conversion circuit 122, and a counter circuit 123.

The pulse detection circuit 121 is the pulse detection circuit according to the first embodiment or the second embodiment described above. The pulse detection circuit 121 receives the output signal from the radiation detector 110, and detects a pulse and a pileup. By the pulse detection circuit 121 detecting the pulse, it is possible to detect the radiation incident on the radiation detector 110. A pulse detection signal and a pileup detection signal output from the pulse detection circuit 121 are input to the AD conversion circuit 122.

The AD conversion circuit 122 receives the output signal from the radiation detector 110, and performs AD conversion thereon. The AD conversion by the AD conversion circuit 122 is controlled by the pulse detection signal and the pileup detection signal.

When the AD conversion circuit 122 receives the pulse detection signal, the AD conversion circuit 122 starts the AD conversion. For example, the AD conversion circuit 122 integrates the output signal from the radiation detector 110 (that is, the pulse detected by the pulse detection circuit), performs the AD conversion on an integrated value, and outputs the AD-converted value. Accordingly, a digital signal indicating energy of the radiation incident on the radiation detector 110 is output.

Integration by the AD conversion circuit 122 may be ended after a predetermined time from a start of the integration or may be ended at a time when a level of the output signal from the radiation detector 110 becomes a predetermined value or below. The integration by the AD conversion circuit 122 may also be ended at a time when an end signal is input from the pulse detection circuit 121 and the like.

The AD conversion circuit 122 may also sample a peak value of the output signal from the radiation detector 110, may perform the AD conversion on the sampled peak value, and may output the AD-converted value. Sampling of the peak value is possible by an existing peak hold circuit and the like. Note that a method of AD converting by the AD conversion circuit 122 is not limited to the above-described method, and the method may be arbitrary selected according to a purpose.

When the AD conversion circuit 122 receives the pileup detection signal, the AD conversion circuit 122 resets the AD conversion being performed. Accordingly, even in a case where a pulse is detected by the pulse detection circuit 121, the AD conversion is not performed in a case where a pileup is detected.

The counter circuit 123 counts each of the AD-converted values output from the AD conversion circuit 122. From a count value of each of the AD converted values counted by the counter circuit 123, an energy spectrum and the like of the radiation can be obtained, whereby it is possible to distinguish the radiation.

As described above, the radiation detection circuit 120 according to this embodiment does not perform the AD conversion on the pulse in a case where the pileup occurs, whereby the energy spectrum and the like of the radiation can be accurately obtained. Thus, it is possible to accurately distinguish the radiation.

Furthermore, since the radiation detection circuit 120 according to this embodiment is provided with the pulse detection circuit 121 according to the first embodiment or the second embodiment, power consumption can be suppressed, a circuit area can be decreased, and operating speed can be made faster.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A pulse detection circuit comprising:
   a conversion circuit to convert an input signal into a thermometer code signal;
   a delay circuit to output a delay signal being the thermometer code signal delayed by a predetermined delay time;
   a first comparator to compare the thermometer code signal with the delay signal and to output an increase signal indicating whether the input signal is larger than the input signal before the delay time;
   a second comparator to compare the thermometer code signal with the delay signal and to output a decrease signal indicating whether the input signal is smaller than the input signal before the delay time;
   a latch to output an increase-decrease signal indicating whether the input signal is increasing or decreasing based on the increase signal and the decrease signal; and
   a generation circuit to generate a pulse detection signal and a pileup detection signal based on the thermometer code signal and the increase-decrease signal.

2. The circuit according to claim 1, wherein
   the conversion circuit further includes a plurality of analog comparators, and
   each of the analog comparators compares the input signal with threshold signals each having a different level.

3. The circuit according to claim 2, wherein
   the thermometer code signal is constituted of an output signal from the analog comparator.

4. The circuit according to claim 1, wherein
   the thermometer code signal is a digital signal indicating a level of the input signal.

5. The circuit according to claim 1, wherein
   the generation circuit generates the pulse detection signal when the increase-decrease signal transits.

6. The circuit according to claim 1, wherein
   the generation circuit generates the pileup detection signal when the increase-decrease signal transits during a period in which the level of the input signal is larger than a predetermined value.

7. The circuit according to claim 1, wherein
   the delay time of the delay circuit is longer than a delay time of the first comparator and the second comparator.

8. The circuit according to claim 2, wherein
   a level of a plurality of the threshold signals is set such that an interval is narrow in a level region having a high probability of occurrence of a peak of the input signal and the interval is wide in a level region having a low probability of occurrence thereof.

9. The circuit according to claim 1, wherein
   the latch is a SR latch provided with an S input terminal and an R input terminal, wherein the S input terminal receives the increase signal, and
the R input terminal receives the decrease signal.

10. The circuit according to claim 1, wherein
the latch is a D latch provided with a G input terminal and an R input terminal, wherein
the G input terminal receives the increase signal, and
the R input terminal receives the decrease signal.

11. A radiation detection circuit comprising:
the circuit according to claim 1; and
an AD conversion circuit to perform AD conversion on an input signal of the pulse detection circuit, wherein
the AD conversion is controlled by the pulse detection signal and the pileup detection signal of the pulse detection circuit.

12. A radiation detection apparatus comprising:
a radiation detector to output a pulse corresponding to an incident radiation; and
the circuit according to claim 11, an output signal from the radiation detector being input to the radiation detection circuit.

* * * * *